United States Patent [19]

Blaimschein

[11] Patent Number: 5,397,532
[45] Date of Patent: Mar. 14, 1995

[54] PROCESS OF MANUFACTURING A SINTERED ELECTRODE FOR USE IN A VOLTAIC CELL COMPRISING REDUCING $FB_2O_3$ TO FE POWDER AND ADDING A FUGITIVE ORGANIC EXPANDING AGENT

[75] Inventor: Franz Blaimschein, Sattledt, Austria

[73] Assignee: Miba Sintermetall Aktiengesellschaft, Laakirchen, Austria

[21] Appl. No.: 88,675

[22] Filed: Jul. 7, 1993

[30] Foreign Application Priority Data

Jul. 10, 1992 [AT] Austria ................... 1415/92

[51] Int. Cl.$^6$ .................. B22F 3/12; B22F 3/16
[52] U.S. Cl. .................. 419/37; 419/30; 419/31; 419/33
[58] Field of Search ........... 419/2, 30, 36, 38, 56, 419/33, 31, 23

[56] References Cited

U.S. PATENT DOCUMENTS

| | | | |
|---|---|---|---|
| 3,802,878 | 4/1974 | Lindstrom | 75/208 R |
| 4,109,060 | 8/1978 | Andersson et al. | 425/566 |
| 4,236,927 | 12/1980 | Bühl et al. | 75/246 |
| 4,582,657 | 4/1986 | Shibata et al. | 264/40.6 |
| 5,262,102 | 11/1993 | Wada | 264/66 |

OTHER PUBLICATIONS

Chemical Abstracts, vol. 83, Nov. 3, 75 No. 18 83:150 317m.

Primary Examiner—Donald P. Walsh
Assistant Examiner—Anthony R. Chi
Attorney, Agent, or Firm—Collard & Roe

[57] ABSTRACT

A sintered electrode having fine pores and coarse pores and intended for use in a voltaic cell is made from reduced iron powder granules, which have been made from an iron(III) oxide powder having a particle size up to 10 micrometers and have a particle size not in excess of 500 micrometers and are compacted to form an electrode body, which is sintered under a reducing atmosphere at a sintering temperature up to 750° C. The iron powder granules are derived from the agglomerated iron powder that is formed as the iron powder is reduced at 600° to 800° C. and optionally after the agglomerated iron powder has been reduced in size, and the iron powder granules before being compacted are mixed with an organic solid expanding agent, which volatilizes during the sintering process and is used in such a proportion and has such a particle size that the resulting sintered electrode has coarse pores in the desired number and the desired size.

5 Claims, No Drawings

PROCESS OF MANUFACTURING A SINTERED ELECTRODE FOR USE IN A VOLTAIC CELL COMPRISING REDUCING FB₂O₃ TO FE POWDER AND ADDING A FUGITIVE ORGANIC EXPANDING AGENT

TECHNICAL FIELD

This invention relates to a process of manufacturing a sintered electrode having fine cores and coarse pores and intended for use in a voltaic cell, which electrode is made from reduced iron powder granules, which have been made from an iron(III) oxide powder having a particle size up to 10 micrometers and have a particle size not in excess of 500 micrometers and are compacted to form an electrode body, which is sintered under a reducing atmosphere at a sintering temperature up to 750° C.

BACKGROUND OF THE INVENTION

In order to ensure for the oxidation-reduction reactions between the electrolyte and the electrode of a voltaic cell a large reaction surface, on the one hand, and to ensure also a transportation of electrolyte to the reaction surface, on the other hand, it has been proposed in U.S. Pat. No. 4,109,060 to make the electrode by sintering iron powder granules which have a high porosity, by which the desired large reaction surface is provided. Electrolyte can be transported through the coarse pores between the iron powder granules which have been sintered together. As a result, the electrochemical requirements can be met in that the sintered electrode has sufficient fine and coarse porosities in combination. To provide fine pores and coarse pores, the granules are made from an iron(III) oxide powder which has a particle size not in excess of 10 micrometers in order to permit the making of a sintered body having the desired coarse porosity. Said granules are optionally dried at a temperature between 600° and 1200° C. and are reduced at a temperature between 500° and 800° C. in order to ensure that each granule has the desired fine porosity and to effect a sintering which imparts to the iron powder granules the inherent strength which is required for the subsequent compacting of the reduced granules. The sinterable body which has been compacted under a pressure which is preferably between 250 and 500 kg/cm² is sintered at a temperature between 600° and 750° C. under a protective gas atmosphere. But that known manufacturing process has the disadvantage that the production of the granules is rather expensive, particularly because a sufficiently large green strength is required, and that the reduced iron powder granules are destroyed as they are compacted so that sufficiently large coarse pores are not obtained in a sufficiently large number. Because large transport pores are present only in an insufficient number, only an inadequate transportation of electrolyte into the sintered electrode is enabled.

SUMMARY OF THE INVENTION

It is an object of the invention to avoid the disadvantages outlined hereinbefore and so to improve a process of manufacturing a sintered electrode of the kind described first hereinbefore that a predetermined relationship between the fine and coarse porosities can be obtained in a simple manner and the resulting sintered electrode has a high mechanical strength.

The object set forth is accomplished in accordance with the invention in that the iron powder granules are derived from the agglomerated iron powder that is formed as the iron powder is reduced at 600° to 800° C. and optionally after the agglomerated iron powder has been comminuted, and the iron powder granules before being compacted are mixed with an organic solid expanding agent, which volatilizes during the sintering process and is used in such a proportion and has such a particle size that the resulting sintered electrode has coarse pores in the desired number and the desired size.

Because the solid expanding agent constitutes a filler in the sinterable body which is compacted, the size and the inherent strength of the reduced iron powder granules are of minor significance and, as the result, the sinterable mixture can be compacted to form an electrode body under a sufficiently high compacting pressure. The particle size and proportion of the expanding agent will determine the coarse porosity of the resulting sintered body, in which the coarse pores will be formed as the expanding agent is volatilized during the sintering of the electrode and for this reason will be only slightly influenced by the conditions under which the granules are compacted. For this reason the particle size of the reduced granules is also of minor significance, provided that said particle size is not in excess of an upper limit so that the granules can effectively be packed for the compacting operation. It is essential that each granule has the desired fine porosity. This requirement can easily be met in accordance with the invention because the fine-grained iron powder is reduced under optimum conditions for the formation of pores. The iron powder is agglomerated as it is reduced at 600° to 800° C., and the agglomerated iron powder, optionally after a suitable reduction in size, can be uniformly mixed with the expanding agent.

As has been stated hereinbefore, the proportion and particle size of the expanding agent will determine the density of the compacted body and also the coarse porosity of the resulting sintered electrode. For this reason the coarse porosity of the sintered electrode can be determined by the selection of the proportion and particle size of the expanding agent. The conventional requirements regarding the coarse porosity can be met in that the proportion of the expanding agent in the total mixture amounts to between 2 and 10% by weight, and an average particle size of the expanding in the range between 50 and 400 micrometers will generally be desirable. The expanding agent must be adapted to be expelled without a residue and without a risk of a mechanical damage to the body as it is sintered, and the decomposition temperature of the expanding agent must not adversely affect the sintering behavior so that the compacting of the sinterable body will not be adversely affected. Said requirements will be met by an expanding agent having a suitable particle size and consisting of a polymer, such as polystyrene, or of wood fibers.

DETAILED DESCRIPTION OF THE PREFERRED EMBODIMENTS

EXAMPLE 1

An $F_2O_3$ powder having an average particle size of 3 micrometers was reduced in a continuously operated tubular heater at a temperature of 700° C. under a hydrogen atmosphere to a residual oxide content below 1%. The agglomerated powder cake formed in the tubular heater was reduced in size in a hammer mill to a particle size of 20 to 100 micrometers. The resulting reduced iron powder granules were mixed in a double-cone mixer with 6% by weight of an expanding agent consisting of polystyrene having a particle size of 125 to 250 micrometers to provide a sinterable mixture, which was compacted in a mold to form an electrode body having a density of 2.0 g/cm$^2$ and was subsequently sintered at a temperature of 700° C. in a protecting pas atmosphere for 60 minutes. The protective pas atmosphere consisted of equal marts of nitrogen and hydrogen. After the sintering the sintered electrode was found to have fine pores of 1.5 to 3 micrometers in size and coarse pores of 100 to 150 micrometers in size. The samples had an overall porosity of 72%. One-third of the porosity was provided by coarse pores.

EXAMPLE 2

An iron oxide powder which was similar to that used in Example 1 was reduced in a bell-type furnace at a temperature of 670° C. for 120 minutes in an atmosphere which contained 70% hydrogen and 30% nitrogen. The reduced iron powder contained less than 2% residual oxide. Granules having a particle size below 355 micrometers were sieved from the agglomerated iron powder and were found to have an average particle size of 20 to 80 micrometers. The reduced iron powder granules were mixed with 3% by weight of an expanding agent consisting of polystyrene having a particle size below 250 micrometers and the resulting mixture was compacted to a density of 2.40 g/cm$^2$. The compacted electrode body was sintered at 730° C. for 60 minutes in a nitrogen-hydrogen atmosphere. The resulting sintered electrode had fine pores in a size of 1 micrometer and coarse pores in a size of about 100 micrometers. The total porosity amounted to about 70% and consisted of a fine porosity of about 80% and a coarse porosity of 20%.

EXAMPLE 3

Reduced iron powder granules produced as in Example 1 were mixed with 8% by weight of an expanding agent consisting of wood chips having a particle size below 350 micrometers. The resulting sinterable mixture was sintered under the same conditions as in Example 1. The resulting sintered electrode had fine pores in a size of 2 to 3 micrometers and coarse pores in a size of about 150 micrometers. The ratio of the fine and coarse porosities was approximately the same as in Example 1.

I claim:

1. In a process of manufacturing a sintered electrode for use in a voltaic cell, which electrode has fine and coarse pores, which process comprises reducing an iron(III) oxide powder having a particle size not in excess of 10 micrometers to form iron powder granules having fine pores and having a particle size not in excess of 500 micrometers, compacting said iron powder granules to form an electrode body, and sintering said electrode body at a sintering temperature up to 750° C. under a reducing atmosphere, the improvement comprising reducing said iron oxide powder at a temperature of 600° to 800° C. to form an agglomerated iron powder, deriving said iron powder granules from said agglomerated iron powder and mixing said granules with an organic solid expanding agent adapted to be volatilized at said sintering temperature, and compacting the resulting mixture of iron powder granules and expanding agent to form said electrode body.

2. The improvement set forth in claim 1, wherein said agglomerated iron powder is comminuted to provide said iron powder granules.

3. The improvement set forth in claim 1, wherein said expanding agent amounts to 2 to 10% by weight of said mixture and has a particle size of 50 to 400 micrometers.

4. The improvement set forth in claim 3, wherein said expanding agent comprises an organic polymer.

5. The improvement set forth in claim 3, wherein said expanding agent comprises wood fibers.

* * * * *